(12) United States Patent
Yonekura et al.

(10) Patent No.: US 8,995,092 B2
(45) Date of Patent: Mar. 31, 2015

(54) HEAD SUSPENSION HAVING CUTTING SURFACE THAT IS NOT DEBURRED IN ACTUATOR ATTACHING AREA OF BASE PLATE, METHOD OF MANUFACTURING BASE PLATE OF THE HEAD SUSPENSION, AND METHOD OF MANUFACTURING THE HEAD SUSPENSION

(71) Applicant: NHK Spring Co., Ltd., Yokohama-shi, Kanagawa (JP)

(72) Inventors: Ryosuke Yonekura, Kanagawa (JP); Shinji Sugiyama, Kanagawa (JP)

(73) Assignee: NHK Spring Co., Ltd., Kanagawa (JP)

( * ) Notice: Subject to any disclaimer, the term of this patent is extended or adjusted under 35 U.S.C. 154(b) by 0 days.

(21) Appl. No.: 13/972,516

(22) Filed: Aug. 21, 2013

(65) Prior Publication Data

US 2014/0063659 A1     Mar. 6, 2014

(30) Foreign Application Priority Data

Sep. 5, 2012 (JP) .................................. 2012-195134

(51) Int. Cl.
  *G11B 5/48*     (2006.01)
  *G11B 5/127*    (2006.01)

(52) U.S. Cl.
  CPC .............. *G11B 5/1272* (2013.01); *G11B 5/482* (2013.01)
  USPC .................. 360/244.5; 360/244.7; 360/244.8; 360/245.2; 360/294.4

(58) Field of Classification Search
  USPC .......... 360/244.7, 294.1, 294.3, 294.4, 244.5, 360/244.8, 244.9, 245.2
  See application file for complete search history.

(56) References Cited

U.S. PATENT DOCUMENTS

| | | | | |
|---|---|---|---|---|
| 7,167,344 B2 * | 1/2007 | Nakagawa et al. | ........ | 360/294.4 |
| 8,144,435 B2 * | 3/2012 | Greminger et al. | ........ | 360/294.4 |
| 8,369,047 B2 * | 2/2013 | Fujimoto et al. | ........... | 360/294.4 |
| 8,559,137 B2 * | 10/2013 | Imuta | .......................... | 360/294.4 |
| 2010/0195252 A1 * | 8/2010 | Kashima | .................... | 360/294.4 |
| 2010/0296201 A1 * | 11/2010 | Kashima | .................... | 360/294.4 |
| 2010/0302687 A1 * | 12/2010 | Soga et al. | ................. | 360/294.4 |
| 2011/0216446 A1 * | 9/2011 | Iriuchijima | ................ | 360/294.4 |
| 2011/0249366 A1 * | 10/2011 | Fujimoto et al. | ........... | 360/294.4 |
| 2013/0286512 A1 * | 10/2013 | Omachi | ..................... | 360/294.1 |

FOREIGN PATENT DOCUMENTS

JP     2012-014812     1/2012

* cited by examiner

*Primary Examiner* — Jefferson Evans
(74) *Attorney, Agent, or Firm* — Jordan and Hamburg LLP

(57) ABSTRACT

A method of manufacturing a base plate, after deburring and heat-treating a half-finished base plate, cuts off a scrap section at the ends of the scrap section from a half-finished actuator attaching area so that cutting surfaces left in a finished actuator attaching area are positioned onto the inner perimeter of the finished actuator attaching area and are oriented to at least partly face an actuator attaching position inside the finished actuator attaching area.

6 Claims, 11 Drawing Sheets

HEAD SUSPENSION HAVING CUTTING SURFACE THAT IS NOT DEBURRED IN ACTUATOR ATTACHING AREA OF BASE PLATE, METHOD OF MANUFACTURING BASE PLATE OF THE HEAD SUSPENSION, AND METHOD OF MANUFACTURING THE HEAD SUSPENSION

BACKGROUND OF THE INVENTION

1. Field of the Invention

The present invention relates to a head suspension, a method of manufacturing a base plate of the head suspension, and a method of manufacturing the head suspension, the head suspension being a device to support a read/write head to write and read data to and from a magnetic disk or a hard disk in a disk drive of for example, a personal computer.

2. Description of Related Art

A base plate for a head suspension is manufactured as illustrated in FIG. 12, for example. FIG. 12 illustrates a method of manufacturing a head suspension according to a related art (Japanese Unexamined Patent Application Publication No. 2012-14812). In FIG. 12, a base plate chain 101 is processed into a head suspension chain 103, and from the head suspension chain 103, individual head suspensions 105 are cut off.

The base plate chain 101 includes base plates 107 each of which is fabricated into the head suspension 105. The head suspension 105 is of a dual actuator system that uses, in addition to a voice coil motor to turn the head suspension 105 as a whole in a sway direction or a width direction, a piezoelectric element to minutely turn a head of the head suspension 105 in the sway direction. The base plate 107 includes a boss 111 and an actuator base 113. In the base plate chain 101, a plurality of the base plates 107 are joined to a frame 112.

The actuator base 113 has a rear end 115 and a front end 117. The rear and front ends 115 and 117 are spaced from each other in a direction of a rotation radius of the head suspension 105 and are connected to each other through a link 119 that is present at a widthwise center of the base plate 107. On each side of the link 119, there are a pair of actuator attaching areas 121a and 121b that are openings in each of which the piezoelectric element is attached.

In this specification, a "longitudinal direction" corresponds to the direction of the turning radius of the head suspension and a "width direction" to a direction orthogonal to the longitudinal direction.

Along each side of the rear end 115, there are side segments 123b and 125b, and along each side of the front end 117, there are side segments 123a and 125a. The side segments 123a (125a) and 123b (125b) extend in the longitudinal direction, are spaced from each other, and face each other, so that the front end 117 is movable relative to the rear end 115.

The base plate chain 101 is deburred by, for example, chemical polishing, electrolytic polishing, or barrel polishing, and load beams 125 are connected to the respective base plates 107 in the base plate chain 101. Thereafter, piezoelectric elements 127a and 127b each made of, for example, PZT (lead zirconate titanate) are attached in the respective actuator attaching areas 121a and 121b of each base plate 107 with a nonconductive adhesive. Thereafter, a flexure having a head and wiring is attached to each head suspension 105, thereby forming the head suspension chain 103. The head suspension chain 103 is cut into individual head suspensions 105.

In the base plate chain 101 to be subjected to the above-mentioned processes, each base plate 107 has the actuator attaching areas 121a and 121b and separated side segments 123a, 123b, 125a, and 125b. These parts may entangle among a plurality of base plate chains 101 during the transportation of the base plate chains 101 between processes and may be deformed by receiving external force. The deformation causes material and product losses and increase costs. To avoid the entanglement and deformation, the base plate chains 101 may be aligned before deburring or heat treatment. This, however, deteriorates productivity.

If the base plates 107 are thinner to reduce their weight, the above-mentioned problem will become more serious.

FIG. 13A is a plan view illustrating a base plate 107A with outer frames according to the related art and FIG. 13B is a plan view illustrating a base plate 107B without outer frames according to the related art. These base plates 107A and 107B are individually manufactured. Namely, they are not chained.

In FIG. 13A, the base plate 107A has a single actuator attaching area 121 being an opening and outer frames 129a and 129b that outwardly protrude with respect to the actuator attaching area 121 in the width direction. The actuator attaching area 121 receives a single piezoelectric element.

In FIG. 13B, the base plate 107B is similar to the base plate 107 of FIG. 12, and therefore, is illustrated with the same reference numerals as those of FIG. 12.

When a plurality of the base plates 107A (107B) are simultaneously processed through deburring, heat treatment, and head suspension assembling, the actuator attaching areas 121 (121a, 121b) may entangle among the base plates 107A (107B), to deform front ends 117A (117) and the like.

The barrel polishing, in particular, is speedier for the deburring of the base plates 107A (107B). It, however, frequently causes the entanglement and deformation of the base plates 107A (107).

Compared with the base plate 107A of FIG. 13A, the base plate 107B of FIG. 13B has no outer frames, and therefore, has low rigidity and easily entangles with others to increase material and product losses and decrease productivity.

To solve the problem, the base plate 107B without frames may be provided with a scrap section in a half-finished stage.

FIG. 14 is a view illustrating Step S101 to form a half-finished base plate 107BA and Step S102 to form the base plate 107B.

Step S101 of FIG. 14 forms the half-finished base plate 107BA by pressing a stainless steel thin plate of 100 to 250 micrometers thick. The half-finished base plate 107BA has scrap sections 131a and 131b which are black-colored in FIG. 14 for the sake of explanation. In practice, the scrap sections 131a and 131b are made of the same material as the half-finished base plate 107BA and are integral therewith with no boundaries.

A plurality of the half-finished base plates 107BA are collectively deburred by, for example, barrel polishing, are heat-treated, and are subjected to Step S102. The deburring and heat treatment are carried out to the half-finished base plates 107BA each having the scrap sections 131a and 131b that increase the rigidity of the actuator attaching areas 121a and 121b. Even if many half-finished base plates 107BA are simultaneously processed by, for example, barrel polishing, the actuator attaching areas 121a and 121b of each half-finished base plate 107BA will not entangle with others.

Step S102 of FIG. 14 cuts off the scrap sections 131a and 131b by pressing from the half-finished base plate 107BA, to form the base plate 107B that integrally has the actuator attaching areas 121a and 121b and the boss 111.

The related art of FIG. 14 is capable of suppressing the deformation of the half-finished base plate 107BA during the deburring, heat treatment and the like and realizing easy handling of the half-finished base plate 107BA for the deburring, heat treatment and the like.

The related art, however, has a problem that Step S102 carried out after the deburring process of Step S101 leaves burrs or cut burrs on cutting surfaces at which the scrap sections 131a and 131b are cut off from the half-finished base plate 107BA. These cut burrs may drop off in a completed hard disk drive into which a head suspension having the base plate 107B is installed.

If many half-finished base plates 107BA are processed with a metal mold for cutting off the scrap sections 131a and 131b, blades of the metal mold will become dull to enlarge the cut burrs. The large cut burrs are likely to drop off in hard disk drives.

To minimize the cut burrs, the blades of the metal mold must frequently be maintained. This, however, deteriorates productivity due to intermittence of the manufacturing process.

SUMMARY OF THE INVENTION

An object of the present invention is to provide a head suspension having a base plate capable of reducing risk of dropping burrs from a cutting surface that is left in an actuator attaching area and is not deburred, and methods of manufacturing such base plate and head suspension.

In order to accomplish the object, a first aspect of the present invention provides a head suspension including a base plate that has an actuator attaching area being an opening in which a cutting surface is left and is not deburred, a load beam supported with a resilient part connected to the base plate and supporting a read/write head, an actuator attached to an actuator attaching position in the actuator attaching area, and an adhesive fixing the actuator to the actuator attaching position and covering the cutting surface.

A second aspect of the present invention provides a method of manufacturing a base plate that has an actuator attaching area being an opening to which an actuator is attached, the base plate being used to support, through a resilient part, a load beam that supports a read/write head. The method includes forming a half-finished base plate from a thin plate material, the half-finished base plate having a half-finished actuator attaching area and a scrap section that is formed in the half-finished actuator attaching area, the scrap section bridging the half-finished actuator attaching area so that ends of the scrap section are at least partly positioned onto a portion of the half-finished actuator attaching area corresponding to an inner perimeter of the actuator attaching area that is oriented to face an actuator attaching position defined in the actuator attaching area, deburring and heat-treating the half-finished base plate, and cutting off the scrap section at the ends of the scrap section from the half-finished actuator attaching area so that cutting surfaces left along the actuator attaching area are positioned onto the inner perimeter of the actuator attaching area and are oriented to at least partly face the actuator attaching position in the actuator attaching area.

A third aspect of the present invention provides a method of manufacturing a head suspension, using the base plate manufactured according to the second aspect. The method including arranging an actuator at the actuator attaching position in the actuator attaching area of the base plate, and applying an adhesive to fix the actuator to the actuator attaching position and cover the cutting surfaces left in the actuator attaching area.

According to the first aspect, the head suspension prevent cut burrs from dropping off from the cutting surface because the cutting surface is covered with the adhesive.

According to the second aspect, the half-finished base plate integrally has the scrap section bridging the half-finished actuator attaching area. The scrap section is cut off at the ends thereof from the half-finished actuator attaching area, so that the cutting surfaces left in the actuator attaching area are positioned onto the inner perimeter of the actuator attaching area and oriented to at least partly face the actuator attaching position in the actuator attaching area. When an actuator is fixed to the actuator attaching position in the actuator attaching area with an adhesive, the cutting surfaces oriented to face the actuator attaching position are covered with the adhesive.

According to the third aspect, the cutting surfaces left in the actuator attaching area are coated with the adhesive, thereby to prevent cut burrs from dropping off from the cutting surfaces.

BRIEF DESCRIPTION OF THE DRAWINGS

FIGS. 5A to 5C illustrate a method of manufacturing the base plate of FIG. 2 according to the first embodiment of the present invention, in which FIG. 5A is a plan view illustrating a half-finished base plate, FIG. 5B a plan view illustrating scrap sections to be cut off, and FIG. 5C a plan view illustrating the base plate with the scrap sections cut off;

FIGS. 8A to 8C illustrate a method of manufacturing a base plate according to a modification of the first embodiment, in which FIG. 8A is a plan view illustrating a half-finished base plate, FIG. 8B a plan view illustrating scrap sections to be cut off, and FIG. 8C a plan view illustrating the base plate with the scrap sections cut off;

FIGS. 9A and 9B illustrate a method of manufacturing a base plate according to another modification of the first embodiment, in which FIG. 9A is a plan view illustrating a half-finished base plate and FIG. 9B a plan view illustrating scrap sections to be cut off;

FIGS. 13A and 13B are plan views illustrating base plates individually manufactured according to the related art, in which FIG. 13A illustrates a base plate with outer frames and FIG. 13B a base plate without outer frames.

DETAILED DESCRIPTION OF EMBODIMENTS

A head suspension according to the present invention employs a base plate formed from a half-finished base plate having a scrap section, and is capable of minimizing a risk of dropping burrs in a completed hard disk drive in which the head suspension is installed. For this, the head suspension includes the base plate that has an actuator attaching area being an opening in which a cutting surface is left and is not deburred, a load beam supported with a resilient part connected to the base plate and supporting a read/write head, an actuator attached to an actuator attaching position in the actuator attaching area, and an adhesive fixing the actuator to the actuator attaching position and covering the cutting surface.

Figure 1:
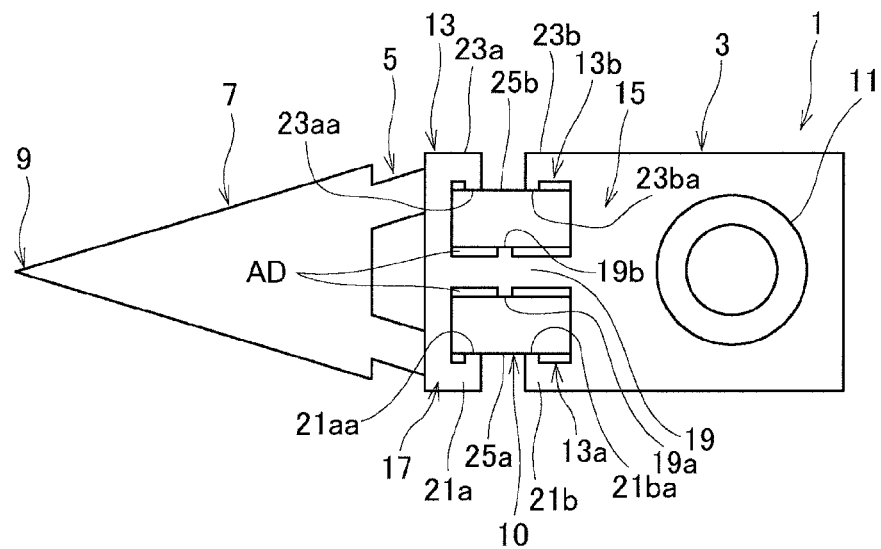
FIG. 1 is a plan view illustrating a head suspension according to a first embodiment of the present invention.

The first embodiment of the present invention will be explained in detail with reference to drawings. FIG. 1 is a plan view illustrating the head suspension 1. When installed in a hard disk drive, the head suspension 1 becomes turnable by a main actuator such as a voice coil motor as explained later. In this specification, a direction of a turning radius of the head suspension 1 is referred to as a "longitudinal direction" or a "front-rear direction" and a direction orthogonal to the longitudinal direction is referred to as a "width direction". In the specification explanation, in a case where symmetric structures are explained, parts on one side of the symmetric structures may be explained and corresponding parts on the other side of the symmetric structures may be represented with numerals in parentheses.

In FIG. 1, the head suspension 1 has a base plate 3, a resilient part 5 connected to the base plate 3, and a load beam 7 supported with the resilient part 5. The base plate 3 is made from a metal plate such as stainless steel plate having a thickness of, for example, about 100 to 250 micrometers. The load beam 7 is provided with a flexure (not illustrated) and the flexure supports a slider that includes a read/write head 9.

The head suspension 1 employs a dual actuator system that involves a voice coil motor serving as a main actuator on a carrier side and a sub-actuator (hereinafter simply also referred to as the "actuator") 10. The base plate 3 integrally has a boss 11 to which a carriage arm of the voice coil motor is connected and a sub-actuator base 13 to which the sub-actuator 10 is installed. The sub-actuator 10 includes piezoelectric elements 25a and 25b that are attached to actuator attaching areas 13a and 13b being openings opened in the sub-actuator base 13 as explained later.

The actuator attaching areas 13a and 13b are formed between a rear end 15 on the boss 11 side and a front end 17 on the load beam 7 side of the base plate 3. The front end 17 and rear end 15 are integrally connected with each other through a link 19 that extends in the longitudinal direction between a widthwise center of the front end 17 and a widthwise center of the rear end 15. The link 19 is located at a widthwise center of the base plate 3.

The sub-actuator base 13 has side segments 21a, 21b, 23a, and 23b that extend between the rear end 15 and the front end 17 along sides in the width direction of the sub-actuator base 13. The side segments 21a and 21b (23a and 23b) face each other and are spaced from each other in the longitudinal direction, so that the actuator attaching area 13a (13b) opens sideward by the spaces to allow the front end 17 to move relative to the rear end 15.

The sub-actuator 10 has the pair of rectangular piezoelectric elements 25a and 25b that are made of PZT (lead zirconate titanate) and are attached with a nonconductive adhesive to the respective actuator attaching areas 13a and 13b, between the rear end 15 and the front end 17.

The boss 11 is uprightly formed on one face of the base plate 3 and is attached to a fitting hole of the carriage arm by ball-caulking, the carriage arm being attached to the voice coil motor (hereinafter also referred to as "VCM").

When installed in a hard disk drive, the head suspension 1 is turned by the VCM through the carriage arm. Additionally, the piezoelectric elements 25a and 25b are deformed depending on a voltage applied thereto, to minutely move the head 9 through the load beam 7 relative to the base plate 3 in a sway direction, i.e., the width direction.

Figure 2:
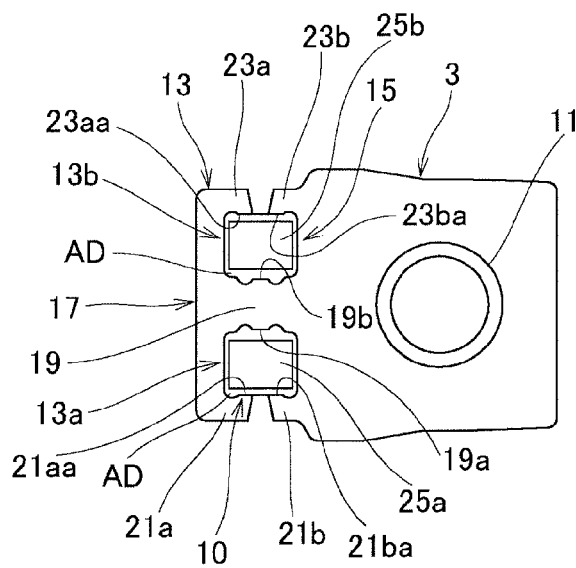
FIG. 2 is a plan view illustrating a base plate of the head suspension of FIG. 1 with piezoelectric elements attached to the base plate.
Figure 3:
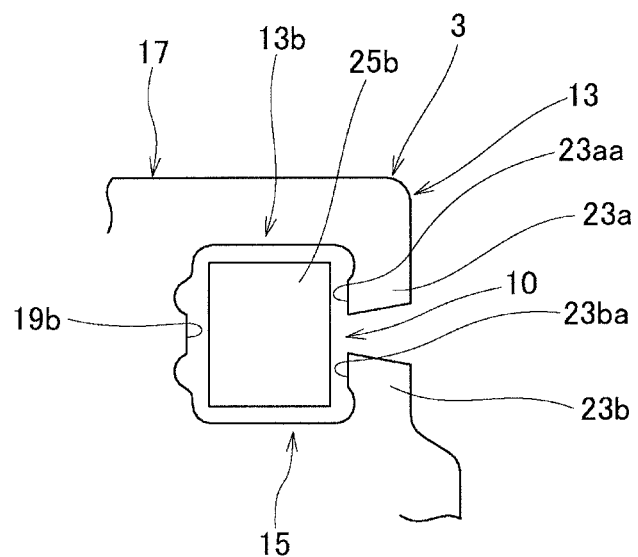
FIG. 3 is an enlarged plan view partly illustrating the base plate and piezoelectric element of FIG. 2.
Figure 4:
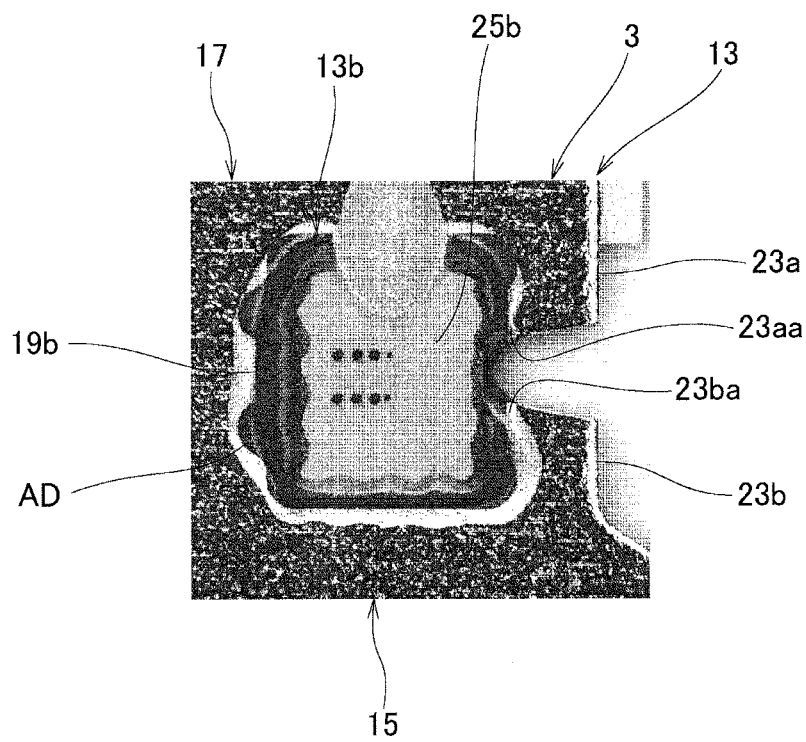
FIG. 4 is a photograph corresponding to FIG. 3.

The base plate 3 of the head suspension 1 will be explained in detail. FIG. 2 is a plan view illustrating the base plate 3 with the piezoelectric elements 25a and 25b attached thereto, FIG. 3 is an enlarged plan view partly illustrating the base plate 3 and piezoelectric element 25b, and FIG. 4 is a photograph corresponding to FIG. 3.

As illustrated in FIGS. 1 to 4, the base plate 3 has cutting surfaces 19a, 21aa, and 21ba in the actuator attaching area 13a and cutting surfaces 19b, 23aa, and 23ba in the actuator attaching area 13b. The cutting surfaces 19a (19b), 21aa (23aa), and 21ba (23ba) are positioned onto an inner perimeter of the actuator attaching area 13a (13b) and oriented to face an actuator attaching position of the piezoelectric element 25a (25b) inside the actuator attaching area 13a (13b). The actuator attaching position is a portion at which the piezoelectric element 25a (25b) is positioned and fixed in the actuator attaching area 13a (13b).

The cutting surfaces 19a and 19b are left at respective sides in the width direction of a central part in the longitudinal direction of the link 19 and the cutting surfaces 21aa and 21ba (23aa and 23ba) are left along the respective side segments 21a and 21b (23a and 23b).

When nonconductive adhesive AD) is applied or filled between the inner perimeter of the actuator attaching area 13a (13b) and the piezoelectric element 25a (25b) to fix the piezoelectric element to the actuator attaching area, the cutting surfaces 19a (19b), 21aa (23aa), and 21ba (23ba) are covered with the nonconductive adhesive existing between the link 19 and side segments 21a and 21b (23a and 23b) of the base plate 3 and the piezoelectric element 25a (25b).

Accordingly, when the head suspension 1 is installed in a hard disk drive, no cut burrs drop off from the cutting surfaces 19a, 19b, 21aa, 23aa, 21ba and 23ba because the cutting surfaces are covered with the nonconductive adhesive AD.

In addition, it is not important for the structure of the present embodiment that the plurality of the cutting surfaces positioned onto the inner perimeter of the actuator attaching area 13a (13b) and oriented to face an actuator attaching position are collectively covered with the nonconductive adhesive AD. In other words, it is important for the structure of the present embodiment that each of such cutting faces is covered with the nonconductive adhesive AD.

Namely, the present embodiment has the structure in which a cutting surface left in the actuator attaching area 13a (13b) is positioned onto the inner perimeter of the actuator attaching area 13a (13b) and oriented to face the actuator attaching position of the piezoelectric element 25a (25b) inside the actuator attaching area 13a (13b). The cutting surface is covered with the nonconductive adhesive AD.

Figure 5A:
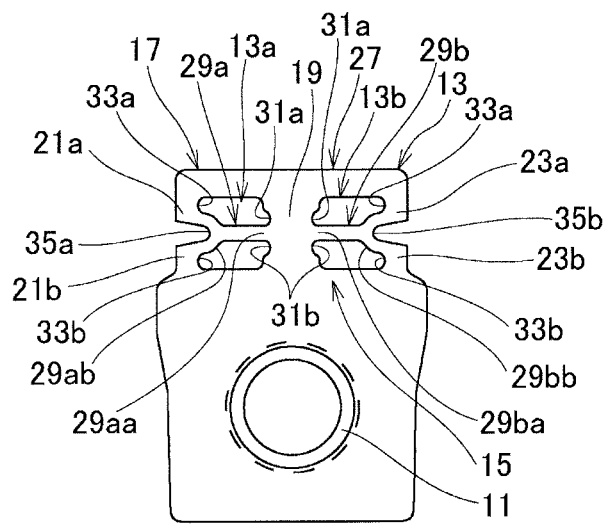
Figure 5B:
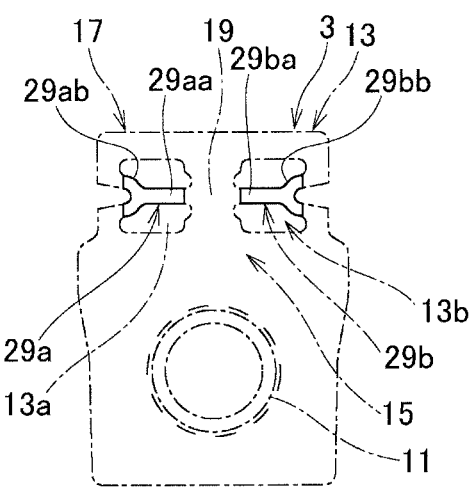

A method of manufacturing the base plate 3 according to the first embodiment of the present invention will be explained with reference to FIGS. 5A to 5C in which FIG. 5A is a plan view illustrating a half-finished base plate 27. FIG. 5B a plan view illustrating scrap sections to be cut off, and FIG. 5C a plan view illustrating the finished base plate 3.

FIG. 5A is a first step that forms the half-finished base plate 27 from a thin metal plate such as stainless steel thin plate having a thickness of about 100 to 250 micrometers. Each part of the half-finished base plate 27 is basically represented with the same name and same reference numeral as those of a corresponding part of the base plate 3 of FIGS. 1 to 4.

The half-finished base plate 27 has a scrap sections 29a and 29b so as to bridge the respective inner perimeters of the actuator attaching areas 13a and 13b in the width direction. Namely, the scrap section 29a (29b) is formed in a half-finished actuator attaching area as the actuator attaching area 13a (13b) in the half-finished base plate 27 and bridges the half-finished actuator attaching area in the width direction. With the scrap section 29a (29b), the actuator attaching area 13a (13b) in the half-finished base plate 27 is closed. In this closed state, the actuator attaching area 13a (13b) has openings separated by the scrap section 29a (29b).

Each end of the scrap section 29a (29b) formed in Step S1 of FIG. 5A is oriented inwardly, i.e., toward the actuator attaching position in the actuator attaching area 13a (13b). In other words, each end of the scrap section 29a (29b) is positioned onto a portion of the half-finished actuator attaching area corresponding to the inner perimeter of finished actuator attaching area 13a (13b) that is oriented to face the actuator attaching position defined in the finished actuator attaching area 13a (13b). In addition, the finished actuator attaching area 13a (13b) is the opening from which the scrap section 29a (29b) has been cut off and is not deburred.

The scrap section 29a (29b) crosses a longitudinally-central part of the actuator attaching area 13a (13b) in the width direction. An inner end 29aa (29ba) of the scrap section 29a (29b) is integral with the link 19. An outer end 29ab (29bb) of the scrap section 29a (29b) forms an arch and is integral with the side segments 21a and 21b (23a and 23b).

On each side of the inner end 29aa (29ba), the link 19 has recesses 31a and 31b. On each side of the outer end 29ab (29bb), the side segments 21a and 21b (23a and 23b) have recesses 33a and 33b, respectively. The recesses 33a and 33b and an arched recess 35a (35b) of the outer end 29ab (29bb) alternate and partly overlap in the longitudinal direction.

Namely, an apex of the arched recess 35a (35b) is more inward in the width direction than apexes of the recesses 33a and 33b on the half-finished base plate 27. This positional relationship allows the outer end 29ab (29bb) of the scrap section 29a (29b) to be cut with a linear blade in the longitudinal direction across the recesses 33a and 33b and arched recess 35a (35b). Also, it allows the inner end 29aa (29ba) of the scrap section 29a (29b) to be cut with a linear blade in the longitudinal direction across the recesses 31a and 31b.

FIG. 5B is a second step that deburrs and heat-treats the half-finished base plate 27 and then cuts off the scrap sections 29a and 29b (illustrated with continuous lines in FIG. 5B) at the inner and outer ends 29aa, 29ba, 29ab, and 29bb.

According to the embodiment, cutting the scrap sections 29a and 29b in the second step of FIG. 5B is carried out so that all the cutting surfaces 19a (19b), 21aa (23aa), and 21ba (23ba) left in the actuator are positioned onto the inner periphery of the actuator attaching area 13a (13b) and are oriented inwardly, i.e., to face the actuator attaching position in the actuator attaching area 13a (13b).

Namely, a cutting blade is arranged in the longitudinal direction across the recesses 31a and 31b of the link 19, to cut the inner end 29aa (29ba). Also, a cutting blade is arranged in the longitudinal direction across the recesses 33a and 33b of the side segments 21a and 21b (23a and 23b) and the arched recess 35a (35b), to cut the outer end 29ab (29bb).

Figure 5C:
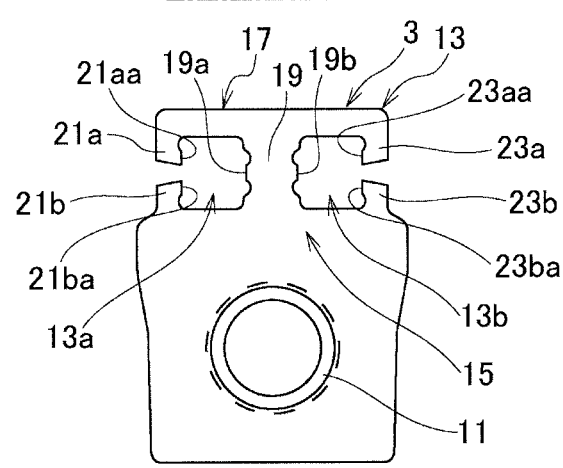

In this way, the second step of FIG. 5B forms the base plate 3 illustrated in FIG. 5C that integrally has the actuator attaching areas 13a and 13b for attaching the piezoelectric elements 25a and 25b and the boss 11 to be connected to a voice coil motor. All the cutting surfaces 19a, 19b, 21aa, 21ba, 23aa, and 23ba left in the actuator attaching areas 13a and 13b are positioned onto the inner perimeters of the actuator attaching areas 13a and 13b and are inwardly oriented to face the actuator attaching positions in the actuator attaching areas 13a and 13b.

A method of manufacturing a head suspension according to the first embodiment of the present invention will be explained with reference to FIG. 6 that is a flowchart illustrating a method of manufacturing head suspensions from a half-finished base plate chain.

Figure 6:
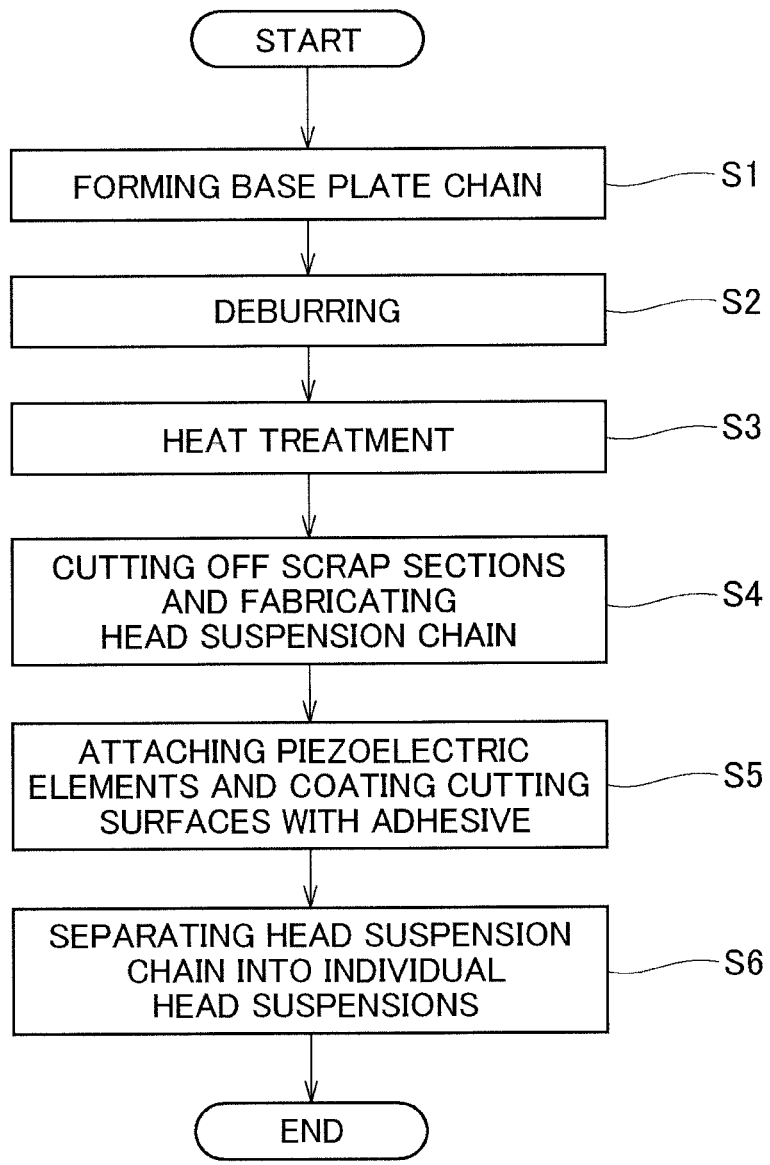
FIG. 6 is a flowchart illustrating a method of manufacturing head suspensions from a half-finished base plate chain according to the first embodiment of the present invention.
Figure 12:
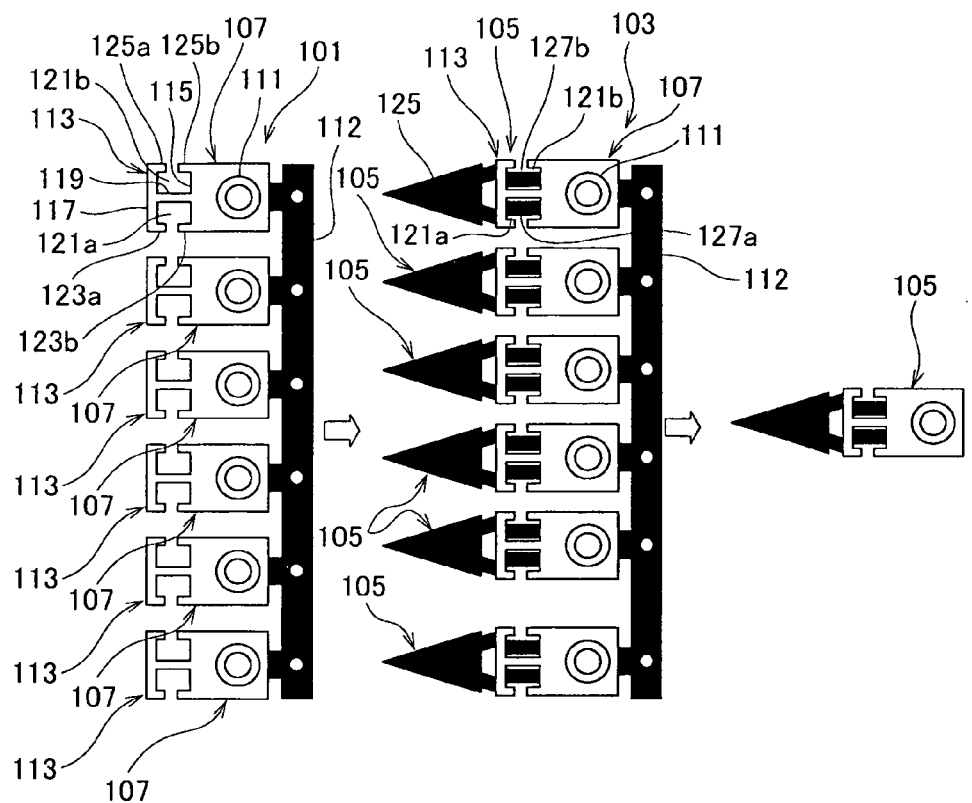
FIG. 12 illustrates a method of manufacturing head suspensions according to a related art.
Figure 13A:
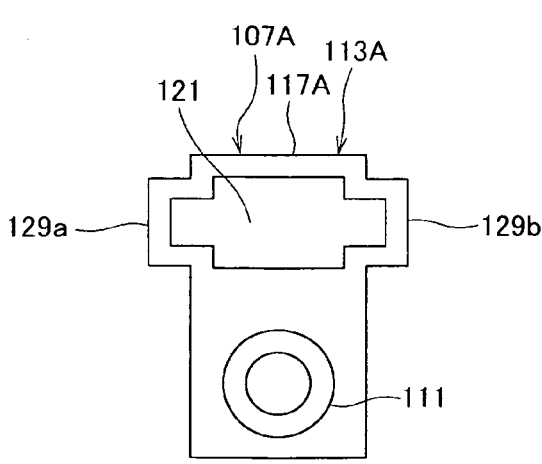
Figure 13B:
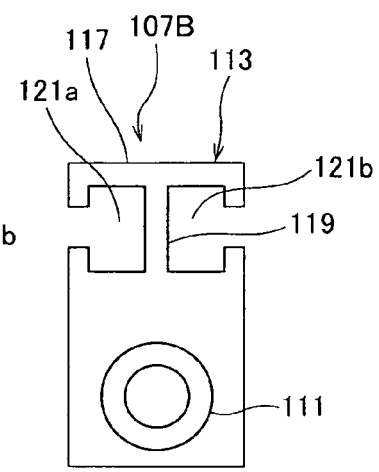
Figure 14:
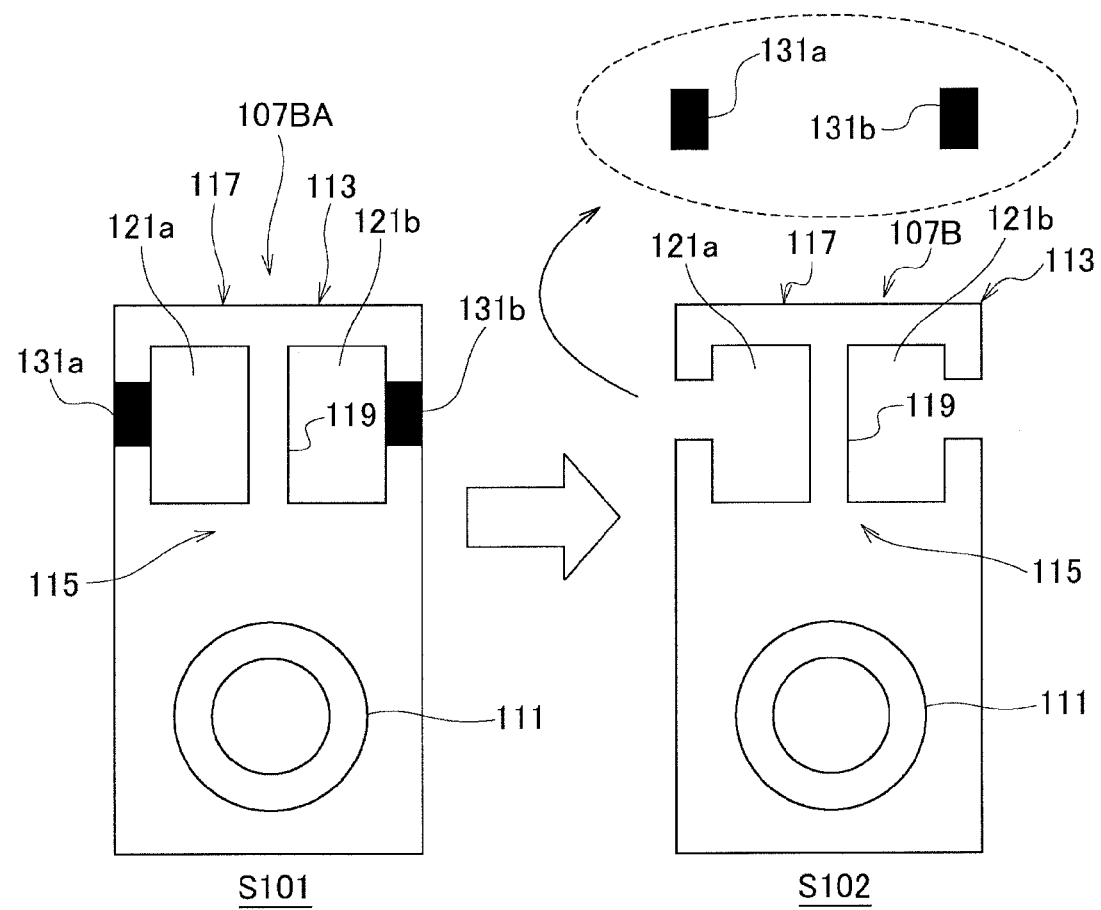
FIG. 14 illustrates a method of manufacturing a base plate according to the related art.

In FIG. 6, Step S1 forms a half-finished base plate chain by, for example, punching press. The half-finished base plate chain is similar to that illustrated in FIG. 12 and has a plurality of chained half-finished base plate 27 illustrated in FIG. 5A.

Step S2 deburrs a plurality of the half-finished base plate chains by, for example, chemical polishing or electrolytic polishing. At this time, the scrap sections 29a and 29b of each half-finished base plate 27 secure the shape of the actuator attaching areas 13a and 13b and prevents the half-finished base plate 27 from entanglement with respect to the others at the actuator attaching areas 13a and 13b due to the closed state thereof, to prevent deformation of the half-finished base plate 27.

Step S3 heat-treats the deburred half-finished base plate chains. During this step, the entanglement and deformation are also prevented similar to Step S2.

Step S4 cuts off the scrap sections 29a and 29b from each half-finished base plate 27 as illustrated in FIG. 5B and attaches a load beam to each base plate 3.

Step S5 arranges, like FIG. 1, the piezoelectric elements 25a and 25b at the respective actuator attaching positions inside the actuator attaching areas 13a and 13b of each base plate 3 and applies a nonconductive adhesive between the actuator attaching areas 13a and 13b and the piezoelectric elements 25a and 25b.

At this time, all of the cutting surfaces 19a, 19b, 21aa, 21ba, 23aa, and 23ba left by cutting in Step S4 in the actuator attaching areas 13a and 13b are positioned onto the inner perimeters of the actuator attaching areas 13a and 13b and are inwardly oriented to face the actuator attaching positions in the actuator attaching areas 13a and 13b. Accordingly, when the nonconductive adhesive is applied in Step S5 between the actuator attaching areas 13a and 13b and the piezoelectric elements 25a and 25b, the cutting surfaces 19a, 19b, 21aa, 21ba, 23aa, and 23ba are entirely covered and coated with the nonconductive adhesive.

Once the nonconductive adhesive hardens, the piezoelectric elements 25a and 25b are fixed to the actuator attaching areas 13a and 13b and the cutting surfaces 19a, 19b, 21aa, 21ba, 23aa, and 23ba are finally entirely coated with the nonconductive adhesive.

Step S6 cuts and separates each head suspension chain formed through Step S5 into individual head suspensions 1.

Figure 7:
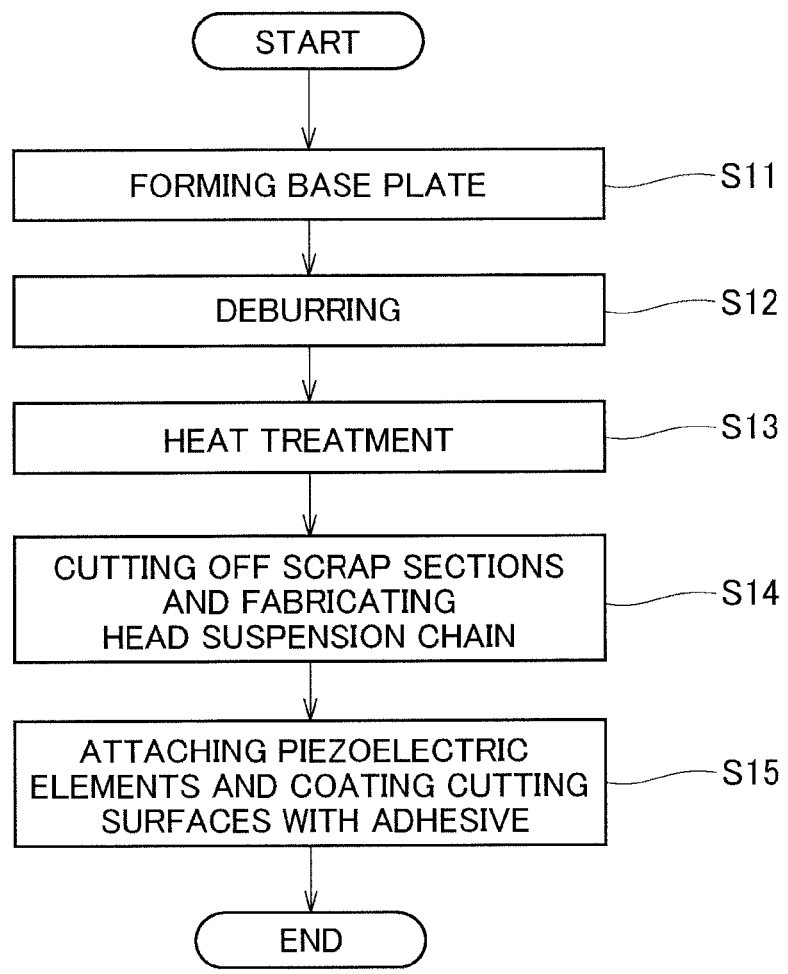
FIG. 7 is a flowchart illustrating a method of manufacturing a head suspension from an individual half-finished base plate according to a modification of the first embodiment.

FIG. 7 is a flowchart illustrating a method of manufacturing a head suspension according to a modification of the first embodiment of FIG. 6. This modification individually manufactures head suspensions without forming a chain of base plates or a chain of head suspensions.

In FIG. 7, Step S11 individually forms a hall-finished base plate 27 similar to FIG. 5A. Steps S12, S13, S14, and S15 are substantially the same as Steps S2, S3, S4, and S5 of FIG. 6 except that the modification of FIG. 7 individually handles unchained half-finished base plates unlike the first embodiment of FIG. 6 that collectively handles a plurality of half-finished base plate 27 as a half-finished base plate chain. Accordingly, the modification of FIG. 7 has no step corresponding to Step S6 of FIG. 6.

The head suspension 1 manufactured according to any one of the methods of FIGS. 6 and 7 has the cutting surfaces 19a, 19b, 21aa, 21ba, 23aa, and 23ba entirely coated with the nonconductive adhesive AD. Accordingly, when the head suspension 1 is installed in a hard disk drive, the nonconductive adhesive AD prevents cut burrs from dropping off the cutting surfaces 19a, 19b, 21aa, 21ba, 23aa, and 23ba.

This means that the cutting surfaces 19a, 19b, 21aa, 21ba, 23aa, and 23ba are allowed to have cut burrs when producing a large number of base plates 3. This reduces the number of maintenance operations of a metal mold for cutting the scrap sections 29a and 29b, i.e., intermittence of the manufacturing process and improves productivity.

In the deburring step S2 or S12 and heat-treating step S3 or S13, the scrap sections 29a and 29b prevent deformation of each half-finished base plate 27, thereby improving the yield of base plates.

Figure 8A:
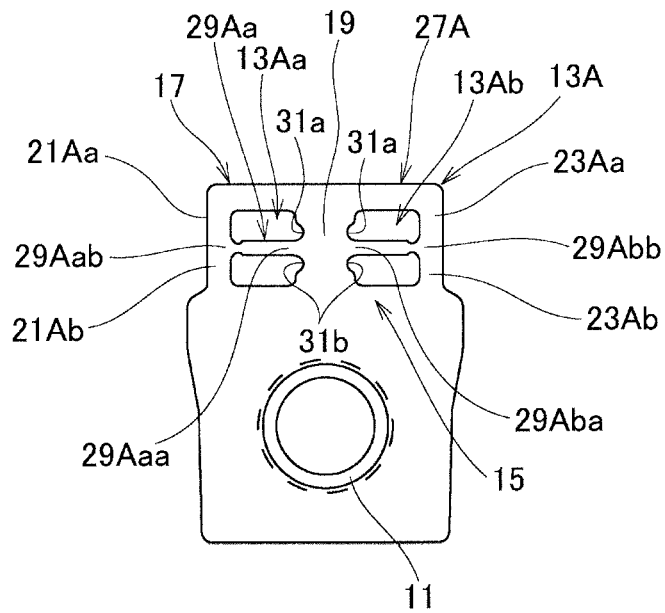
Figure 8B:
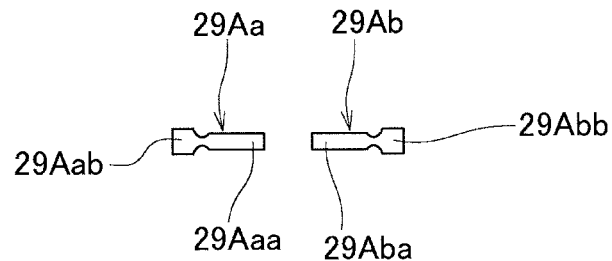
Figure 8C:
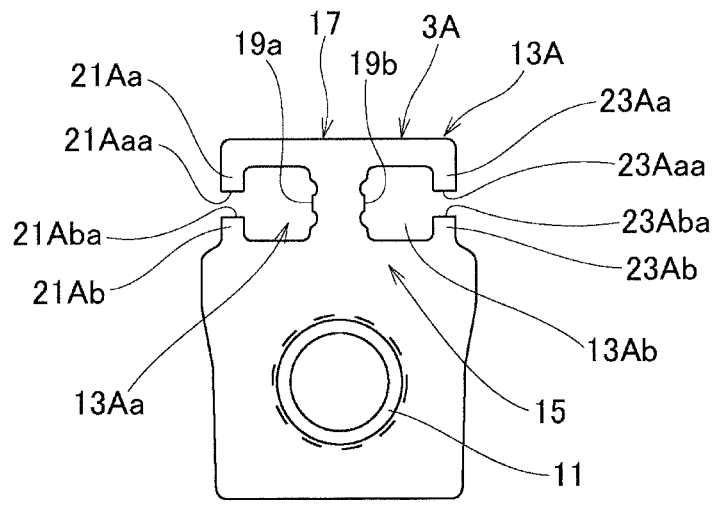

FIGS. 8A to 8C illustrate a method of manufacturing a base plate according to a modification of the first embodiment of FIGS. 5A to 5C. FIG. 8A is a plan view illustrating a half-finished base plate, FIG. 8B a plan view illustrating scrap sections to be cut off, and FIG. 8C a plan view illustrating the base plate with the scrap sections cut off. The half-finished base plate 27A of FIG. 8A is basically the same as the half-finished base plate 27 of FIG. 5A, and therefore, like parts are represented with like reference numerals plus "A" in FIGS. 8A to 8C to omit overlapping explanations.

In FIG. 8A, the half-finished base plate 27A has scrap sections 29Aa and 29Ab with respective outer ends 29Aab and 29Abb. The outer end 29Aab (29Abb) is straight in the width direction without arch and is integrally connected to side segments 21Aa and 21Ab (23Aa and 23Ab). Inner ends 29Aaa and 29Aba of the scrap sections 29Aa and 29Ab are the same as those of FIG. 5A.

In FIG. 8B, the inner ends 29Aaa and 29Aba of the scrap sections 29Aa and 29Ab are cut off similar to the inner ends 29aa and 29ba of FIG. 5B and outer ends 29Aab and 29Abb thereof are cut off between the side segments 21Aa and 21Ab and between the side segments 23Aa and 23Ab in the longitudinal direction, respectively. As a result, after the deburring step S2 or S12 and heat-treating step S3 or S13 of FIG. 6 or 7, cutting surfaces 19a, 19b, 21Aaa, 21Aba, 23Aaa, and 23Aba are left. As illustrated in FIG. 8C, the cutting surfaces 21Aaa, 21Aba, 23Aaa, and 23Aba are oriented in the longitudinal direction but not to face actuator attaching positions in finished actuator attaching areas 13Aa and 13Ab from which the scrap sections 29Aa and 29Ab have been cut off.

When piezoelectric elements are attached to the actuator attaching areas 13Aa and 13Ab of the base plate 3A with a nonconductive adhesive to form a head suspension, the cutting surfaces 19a and 19b are covered and coated with the nonconductive adhesive. At this time, the nonconductive adhesive is additionally applied to cover and coat the cutting surfaces 21Aaa, 21Aba, 23Aaa, and 23Aba.

In this way, the modification of FIGS. 8A to 8C cuts off the scrap sections 29Aa and 29Ab at the inner ends 29Aaa and 29Aba and outer ends 29Aab and 29Abb from the half-finished actuator attaching areas so that cutting surfaces 19a, 19b, 21Aaa, 21Aba, 23Aaa, and 23Aba left in the actuator attaching areas 13Aa and 13Ab are positioned onto the inner perimeters of the actuator attaching areas 13Aa and 13Ab and are oriented to at least partly face the actuator attaching positions in the actuator attaching areas 13Aa and 13Ab.

Then, parts of the cutting surfaces 19a, 19b, 21Aaa, 21Aba, 23Aaa, and 23Aba which are oriented to face the actuator attaching positions are coated with the nonconductive adhesive when the nonconductive adhesive is applied to fix the piezoelectric elements to the actuator attaching positions.

On the other hand, parts of the cutting surfaces 19a, 19b, 21Aaa, 21Aba, 23Aaa, and 23Aba that are not oriented to face the actuator attaching positions are coated by additionally applying the nonconductive adhesive.

The modification of FIGS. 8A to 8C provides the same effect as the first embodiment of FIGS. 5A to 5C.

Figure 9A:
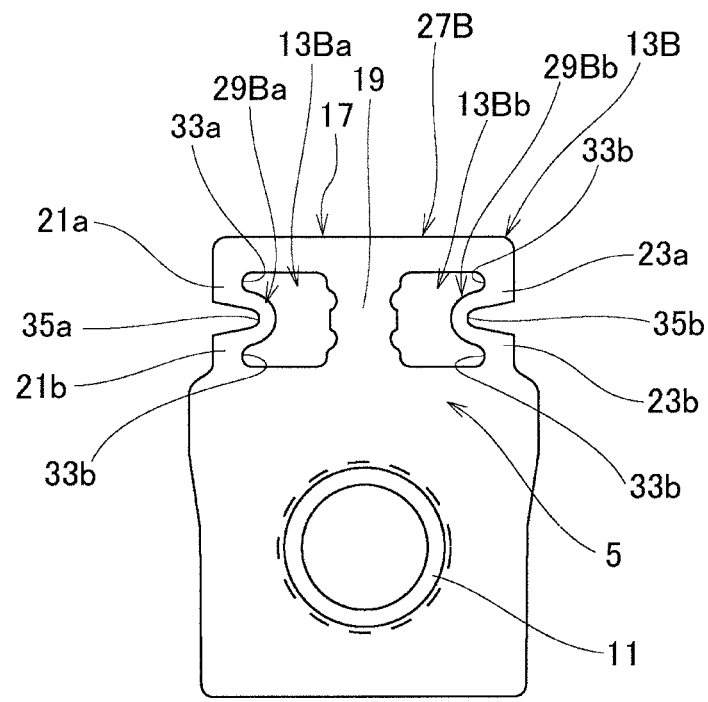
Figure 9B:
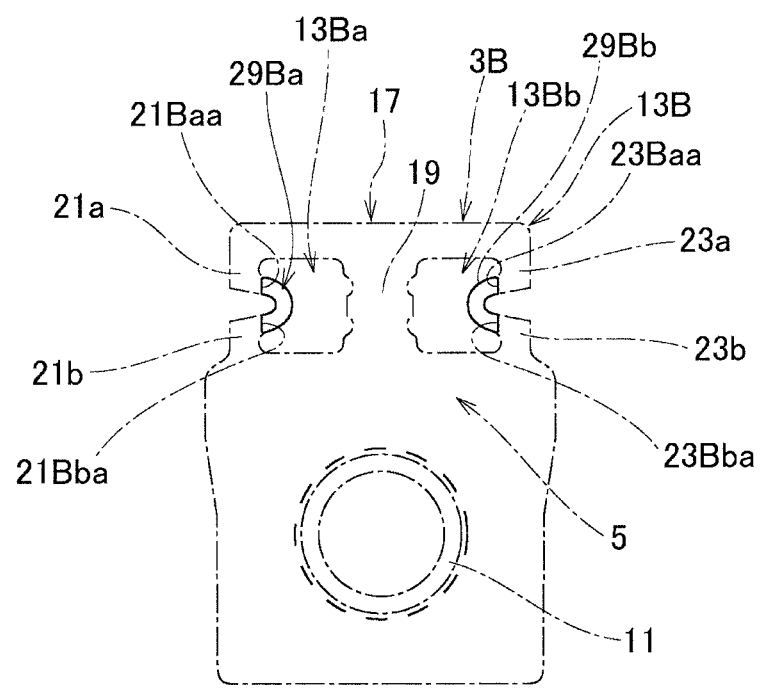

FIGS. 9A and 9B illustrate a method of manufacturing a base plate according to another modification of the first embodiment, in which FIG. 9A is a plan view illustrating a half-finished base plate and FIG. 9B a plan view illustrating scrap sections to be cut off. The half-finished base plate 27B of FIG. 9A is basically the same as the half-finished base plate 27 of FIG. 5A, and therefore, like parts are represented with like reference numerals plus "B" in FIGS. 9A and 9B to omit overlapping explanations.

In FIG. 9A, the half-finished base plate 27B has arch-shaped scrap sections 29Ba and 29Bb that correspond to the outer ends 29ab and 29bb of the scrap sections 29a and 29b of FIG. 5A.

The scrap sections 29Ba and 29Bb are cut off similar to the outer ends 29ab and 29bb of FIG. 5B. After the deburring step S2 or S12 and heat-treating step S3 or S13 of FIG. 6 or 7, cutting surfaces 21Baa, 21Bab, 23Baa, and 23Bba are left. As illustrated in FIG. 9B, these cutting surfaces are positioned onto inner perimeters of finished actuator attaching areas 13Ba and 13Bb and are oriented to face actuator attaching positions in the actuator attaching areas 131a and 13Bb.

When piezoelectric elements are attached to the actuator attaching areas 13Ba and 13Bb of the base plate 313 with a nonconductive adhesive to form a head suspension, the cutting surfaces 21Baa, 21Bab, 23Baa, and 23Bba are covered and coated with the nonconductive adhesive.

The modification of FIGS. 9A and 9B provides the same effect as the first embodiment of FIGS. 5A to 5C.

FIGS. 10A to 10E and 11A to 11E illustrate methods of manufacturing base plates according to other modifications of the first embodiment of FIGS. 5A to 5C, each particularly illustrating scrap sections to be cut off from a half-finished base plate.

Figure 10A:
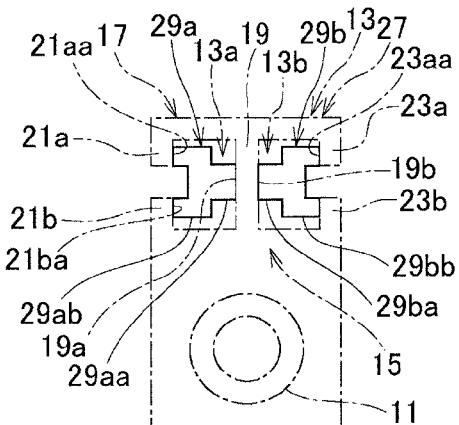
FIGS. 10A to 10E and 11A to 11E illustrate methods of manufacturing base plates according to other modifications of the first embodiment, each particularly illustrating scrap sections to be cut off from a half-finished base plate.

The modification of FIG. 10A is substantially the same as the first embodiment of FIGS. 5A to 5C, and therefore, employs the same reference numerals and the explanation thereof is omitted. In addition, the modification of FIG. 10A provides the same effect as the first embodiment of FIGS. 5A to 5C.

Figure 10B:
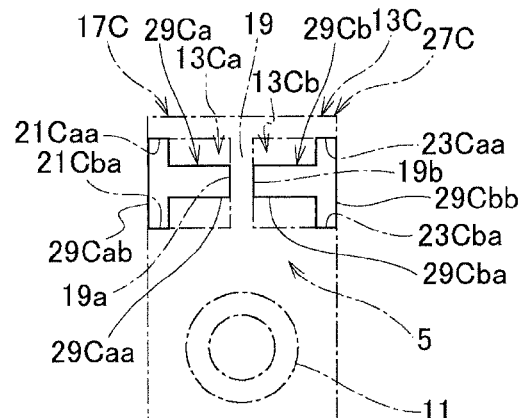

The modification of FIG. 10B is similar to that of FIG. 10A, and therefore, like parts are represented with like reference numerals plus "C" in FIG. 10B to omit overlapping explanations.

In FIG. 10B, a sub-actuator base 13C in a half-finished base plate 27C includes outer ends 29Cab and 29Cbb of scrap sections 29Ca and 29Cb in place of the side segments 21a, 21b, 23a, and 23b of the sub-actuator base 13 and the outer ends 29ab and 29bb of the scrap sections 29a and 29b of FIG. 100A.

Namely, side segments of the sub-actuator base 13C in the half-finished base plate 27C are formed of the outer ends 29Cab and 29Cbb of the scrap sections 29Ca and 29Cb. This configuration widens finished actuator attaching areas 13Ca and 13Cb to the regions corresponding to the side segments of the sub-actuator base 13C of the half-finished base plate 27C, to accommodate wider piezoelectric elements.

In the half-finished base plate 27C, all the outer ends 29Cab and 29Cbb and inner ends 29Caa and 29Cba of the scrap sections 29Ca and 29Cb are oriented toward actuator attaching positions in the actuator attaching areas 13Ca and 13Cb.

After the deburring step S2 or S12 and heat-treating step S3 or S13 of FIG. 6 or 7, the inner ends 29Caa and 29Cba are cut similar to those of FIG. 10A and the outer ends 29Cab and 29Cbb are cut at boundaries with respect to a rear end 15C and a front end 17C, to leave cutting surfaces 19a, 19b, 21Caa, 21Cba, 23Caa, and 23Cba. These cutting surfaces are positioned onto the inner perimeters of the finished actuator attaching areas 13Ca and 13Cb and are oriented to face the actuator attaching positions in the finished actuator attaching areas 13Ca and 13Cb.

When piezoelectric elements are attached to the actuator attaching areas 13Ca and 13Cb of the base plate 3C with a nonconductive adhesive to form a head suspension, the cutting surfaces 19a, 19b, 21Caa, 21Cba, 23Caa, and 23Cba are covered and coated with the nonconductive adhesive.

The modification of FIG. 10B provides the same effect as the modification of FIG. 10A. Additionally, the modification of FIG. 10B is capable of adopting wider piezoelectric elements.

Figure 10C:
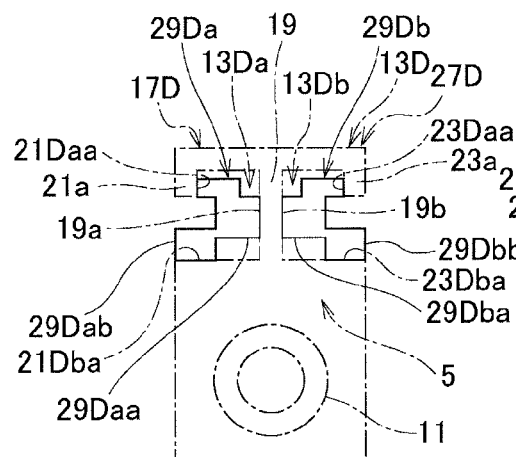

The modification of FIG. 10C is similar to that of FIG. 10A, and therefore, like parts are represented with like reference numerals plus "D" in FIG. 10C to omit overlapping explanations.

In FIG. 10C, a sub-actuator base 13D in a half-finished base plate 27D includes outer ends 29Dab and 29Dbb of scrap sections 29Da and 29Db in place of the side segments 21b and 23b of the sub-actuator base 13 and the outer ends 29ab and 29bb of the scrap sections 29a and 29b of FIG. 10A.

Namely, the outer ends 29Dab and 29Dbb in the half-finished base plate 27D of FIG. 10C has rear portions that contain the side segments 21b and 23b of the sub-actuator base 13 of FIG. 10A, and rear portions of the outer ends 29Dab and 29Dbb are wider than the side segments 21b and 23b and are continuous to a rear end 15D.

In the half-finished base plate 27D, inner ends 29Daa and 29Dba of the scrap sections 29Da and 29Db, front portions that are the side segment (21a, 23a) sides of the outer ends 29Dab and 29Dbb, and part of the rear portions that are the side segment (21b, 23b) sides of the outer ends 29Dab and 29Dbb are oriented toward actuator attaching positions in actuator attaching areas 13Da and 13Db.

After the deburring step S2 or S12 and heat-treating step S3 or S13 of FIG. 6 or 7, the inner ends 29Daa and 29Dba are cut similar to those of FIG. 10A and the outer ends 29Dab and 29Dbb are cut from the rear end 15D, to leave cutting surfaces 19a, 19b, 21Daa, 21Dba, 23Daa, and 23Dba.

The cutting surfaces 19a, 19b, 21Daa, and 23Daa can be cut with a longitudinal cutting mold and the cutting surfaces 21Dba and 23Dba can be cut with a lateral cutting mold separated from the longitudinal cutting mold, to elongate the service lives of the cutting molds.

The cutting surfaces 19a, 19b. 21Daa, and 23Daa are positioned onto inner perimeters of finished actuator attaching areas 13Da and 13Db and are oriented to face the actuator attaching positions in the finished actuator attaching areas 13Da and 13Db. The cutting surfaces 21Dba and 23Dba are entirely positioned onto the inner perimeters but partly oriented to face the actuator attaching positions on an inner side in the width direction and mostly oriented frontward outside the actuator attaching positions.

When piezoelectric elements are attached to the actuator attaching areas 13Da and 13Db of the base plate 3D with a nonconductive adhesive to form a head suspension, the cutting surfaces 19a, 19b, 21Daa, and 23Daa and part of the cutting surfaces 21Dba and 23Dba on the inner side in the width direction are covered and coated with the nonconductive adhesive. At this time, the nonconductive adhesive is additionally applied to cover most part of the cutting surfaces 21Dba and 23Dba.

The modification of FIG. 10C provides the same effect as the modification of FIG. 10A.

Figure 10D:
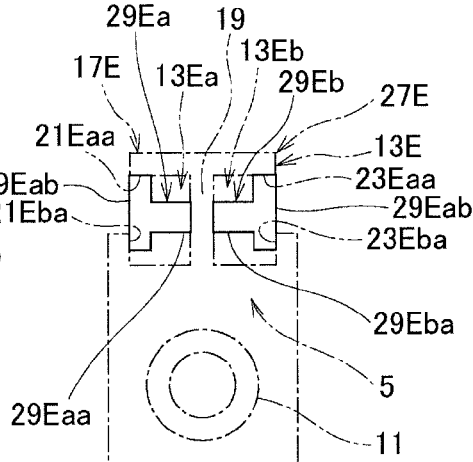

The modification of FIG. 10D is similar to that of FIG. 10A, and therefore, like parts are represented with like reference numerals plus "E" in FIG. 10D to omit overlapping explanations.

In FIG. 10D, a sub-actuator base 13E in a half-finished base plate 27E includes a front end 17E and outer ends 29Eab and 29Ebb of scrap sections 29Ea and 29Eb in place of the side segments 21a and 23a and front end 17 of the sub-actuator base 13 and the outer ends 29ab and 29bb of the scrap sections 29a and 29b of FIG. 10A.

Namely, the front end 17I of FIG. 10D is narrowed in the width direction by the width of the side segments with respect to that of FIG. 10A and the outer ends 29Eab and 29Ebb are extended in the longitudinal direction. Front portions of the outer ends 29Eab and 29Ebb are connected to the front end 17E in the longitudinal direction and rear portions thereof are interiorly parallel to side segments 21b and 23b and connected to side segments 21b and 23b in the width direction.

In the half-finished base plate 27E, inner ends 29Eaa and 29Eba of the scrap sections 29Ea and 29Eb, the front end (17E) sides of the outer ends 29Eab and 29Ebb of the scrap sections 29Ea and 29Eb, and the side segment (21Eb, 23Eb) sides of the outer ends 29Eab and 29Ebb are oriented toward actuator attaching positions in actuator attaching areas 13Ea and 13Eb.

After the deburring step S2 or S12 and heat-treating step S3 or S13 of FIG. 6 or 7, the inner ends 29Eaa and 29Eba are cut similar to those of FIG. 10A and the outer ends 29Eab and 29Ebb are cut from the front end 17E and side segments 21b and 23b, to leave cutting surfaces 19a, 19b, 21Eaa, 21Eba, 23Eaa, and 23Eba. These cutting surfaces are positioned onto inner perimeter of finished actuator attaching areas 13Ea and 13Eb and are oriented to face the actuator attaching positions in the finished actuator attaching areas 13Ea and 13Eb.

When piezoelectric elements are attached to the actuator attaching areas 13Ea and 13Eb of the base plate 3E with a nonconductive adhesive to form a head suspension, the cutting surfaces 19a, 19b, 21Eaa, 21Eba, 23Eaa, and 23Eba are covered and coated with the nonconductive adhesive.

The modification of FIG. 10D provides the same effect as the modification of FIG. 10A. According to the modification of FIG. 10D, a head suspension is capable of being configured to have a load beam that is narrower than the base plate 3E in the width direction.

Figure 10E:
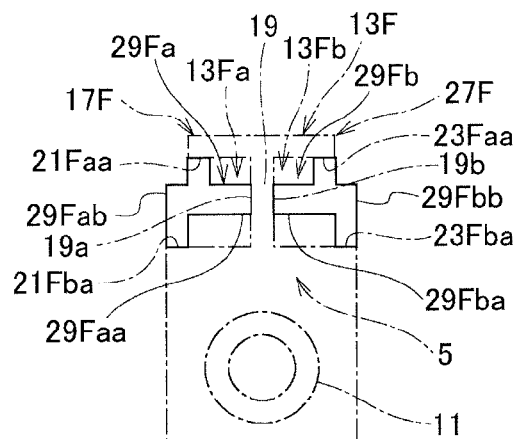

The modification of FIG. 10E is similar to that of FIG. 10A, and therefore, like parts are represented with like reference numerals plus "F" in FIG. 10E to omit overlapping explanations.

In FIG. 10E, a sub-actuator base 13F in a half-finished base plate 27F includes a front end 17F and outer ends 29Fab and 29Fbb of scrap sections 29Fa and 29Fb in place of the side segments 21a, 21b, 23a, and 23b and front end 17 of the sub-actuator base 13 and the outer ends 29ab and 29bb of the scrap sections 29a and 29b of FIG. 10A.

Namely, the front end 17F of FIG. 10E is narrowed in the width direction by the side segments with respect to that of FIG. 10A and the outer ends 29Fab and 29Fbb are stepped. Rear portions of the outer ends 29Fab and 29Fbb correspond to the side segments in the half-finished base plate 27F, front ends thereof are connected to the front end 17F in the longitudinal direction, and rear ends thereof are connected to a rear end 15F in the longitudinal direction.

In the half-finished base plate 27F, inner ends 29Faa and 29Fba of the scrap sections 29Fa and 29Fb and the front end (17F) sides of the outer ends 29Fab and 29Fbb of the scrap sections 29Fa and 29Fb are oriented toward actuator attaching positions in actuator attaching areas 13Fa and 13Fb. The rear portions or rear end (15F) sides of the outer ends 29Fab and 29Fbb are oriented frontward outside the actuator attaching positions.

After the deburring step S2 or S12 and heat-treating step S3 or S13 of FIG. 6 or 7, the inner ends 29Faa and 29Fba are cut similar to those of FIG. 10A and the outer ends 29Fab and 29Fbb are cut from the front end 17F and rear end 15F, to leave cutting surfaces 19a, 19b, 21Faa, 21Fba, 23Faa, and 23Fba. The cutting surfaces 19a, 19b, 21Faa, and 23Faa are positioned onto inner perimeter of finished actuator attaching areas 13Fa and 13Fb and are oriented to face the actuator attaching positions in the finished actuator attaching areas 13Fa and 13Fb. The cutting surfaces 21Fba and 23Fba are positioned onto the inner perimeter of the finished actuator attaching areas 13Fa and 13Fb but oriented frontward outside the actuator attaching positions.

When piezoelectric elements are attached to the actuator attaching areas 13Fa and 13Fb of the base plate 3F with a nonconductive adhesive to form a head suspension, the cutting surfaces 19a, 19b, 21Faa, and 23Faa are covered and coated with the nonconductive adhesive. At this time, the nonconductive adhesive is additionally applied to cover and coat the cutting surfaces 21Fba and 23Fba.

The modification of FIG. 10E provides the same effect as the modification of FIG. 10A. According to the modification of FIG. 10E, a head suspension is capable of being configured to have a load beam that is narrower than the base plate 3F in the width direction.

Although the modifications of FIGS. 10A to 10E each have no recesses 33a, 33b, 35a, 35b, and the like illustrated in FIG. 5A, each modification may have such recesses so that the scrap sections are surely cut with linear blades.

The modifications of FIGS. 11A to 11E are each similar to the modification of FIG. 10A, and therefore, like parts are represented with like reference numerals plus "G" to "K" in FIGS. 11A to 11E, respectively, to omit overlapping explanations.

The modifications of FIGS. 11A to 11E correspond to the modifications of FIGS. 10A to 10E, respectively, except that each of the modifications of FIGS. 11A to 11E has no link 19.

Figure 11A:
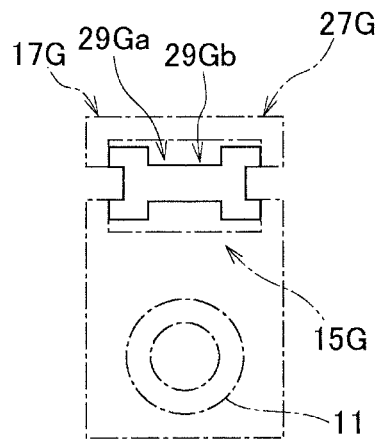
Figure 11B:
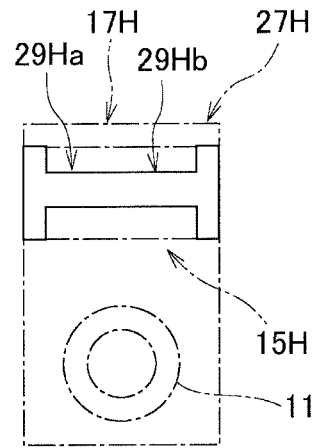
Figure 11C:
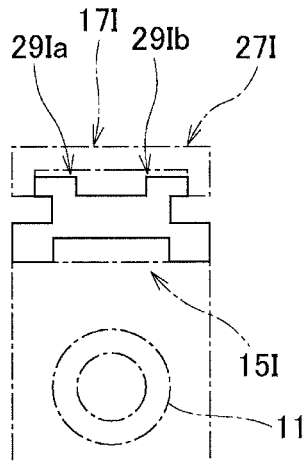
Figure 11D:
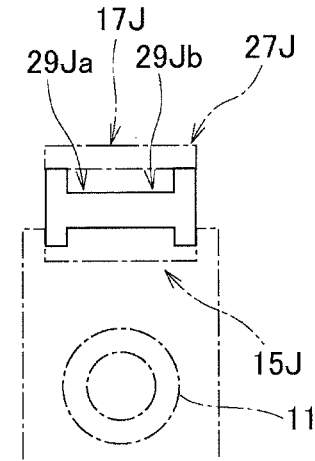
Figure 11E:
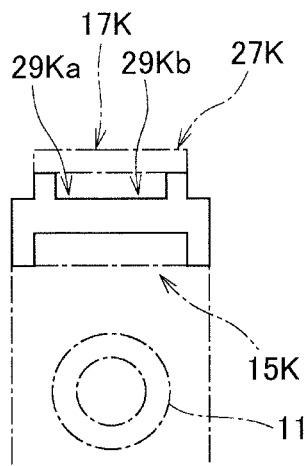

In FIG. 11A, a half-finished base plate 27G includes scrap sections 29Ga and 29Gb that are integrated into one in the width direction. In FIG. 11B, a half-finished base plate 27H includes scrap sections 29Ha and 29Hb that are integrated into one in the width direction. In FIG. 11C, a half-finished base plate 27I includes scrap sections 29Ia and 29Ib that are integrated into one in the width direction. In FIG. 11D, a half-finished base plate 27J includes scrap sections 29Ja and 29Jb that are integrated into one in the width direction. In FIG. 11E, a half-finished base plate 27K includes scrap sections 29Ka and 29Kb that are integrated into one in the width direction.

After the deburring step S2 or S12 and heat-treating step S3 or S13 of FIG. 6 or 7, the scrap sections 29Ga, 29Gb, 29Ha, 29Hb, 29Ia, 29Ib, 29Ja, 29Jb, 29Ka, and 29Kb of FIGS. 11A to 11E are cut off like the scrap sections of FIGS. 10A to 10E except that the modifications of FIGS. 11A to 11E involve no cutting operation of the inner ends 29aa, 29ba, 29Caa, 29Cba, 29Daa, 29 Dba, 29Eaa, 29Eba, 29Faa, and 29Fba of FIGS. 10A to 10E.

Before cutting off the scrap sections 29Ga, 29Gb, 29Ha, 29Hb, 29Ia, 29Ib, 29Ja, 29Jb, 29Ka, and 29Kb, each of the modifications of FIGS. 11A to 11E attaches a reinforcing panel or a resilient part to connect the front end (17G, 17H, 17I, 17J, 17K) to the rear end (15G, 15H, 15I, 15J, 15K) so that the front end (17G, 17H, 17I, 17J, 17K) and rear end (15G, 15H, 15I, 15J, 15K) may not be separated.

Although the modifications of FIGS. 11A to 11E each have no recesses 33a, 33b, 35a, 35b, and the like illustrated in FIG. 5A, each modification may have such recesses so that the scrap sections are surely cut with linear blades.

The shape of each scrap section is optional if the shape is appropriate for preventing entanglement of half-finished base plates.

The scrap section cutting step (FIG. 5B, for example) may be carried out before adjusting the attitude of a head suspension.

The head suspension is completed after adjusting the attitude thereof by irradiating proper locations of the head suspension with a laser beam. The scrap sections are cut off before irradiating the head suspension with a laser beam, to correctly adjust the attitude of the head suspension.

The base plate according to any one of the embodiments and modifications of the present invention may be formed of a single plate or a plurality of plates including a main plate that has a boss and a reinforcing plate that is joined to the main plate by, for example, laser spot welding. In the latter case, the reinforcing plate integrally has an actuator base in which actuator attaching areas are opened.

What is claimed is:

1. A head suspension comprising:
    a base plate that has an actuator attaching area being an opening in the base plate;
    a load beam supported with a resilient part connected to the base plate and supporting a read/write head;
    an actuator attached at an actuator attaching position in the actuator attaching area; and
    an adhesive fixing the actuator to the actuator attaching position, in which
        the base plate comprises a width and, in a longitudinal direction of the base plate, has a front end being longitudinally proximal to the load beam, a rear end being longitudinally distal to the load beam, and a link being longitudinally connected to and extending between a widthwise center of the front end and a widthwise center of the rear end,
        the actuator attaching area is formed along the longitudinal direction of the base plate and between the front end and the rear end of the base plate so as to be disposed adjacent to sides of the link in the width direction of the base plate, and
        the link includes both a longitudinal central part of the link that extends linearly in the longitudinal direction of the base plate and is positioned so as to extend along the sides of the link in the width direction of the base plate, and recesses at portions of the link that longitudinally adjoin respective longitudinal ends of the longitudinal central part of the link so that the longitudinal central part of the link spans linearly from at least one of the recesses to another of the recesses so as to be contiguous with at least two of the recesses.

2. The head suspension of claim 1, wherein the longitudinal central part of the link is positioned onto an inner perimeter of the actuator attaching area and is oriented to face the actuator arranging position inside the actuator attaching area.

3. A method of manufacturing a base plate that has an actuator attaching area being an opening to which an actuator is attached, the base plate being used to support, through a resilient part, a load beam that supports a read/write head, the method comprising:

forming a partially-finished base plate from a thin plate material, the partially-finished base plate having a partially-finished actuator attaching area and a scrap section that is formed in the partially-finished actuator attaching area, the scrap section bridging the partially-finished actuator attaching area so that ends of the scrap section are at least partly positioned onto a portion of the partially-finished actuator attaching area corresponding to an inner perimeter of the actuator attaching area that is oriented to face an actuator attaching position defined in the actuator attaching area;

deburring and heat-treating the partially-finished base plate; and cutting off the scrap section at the ends of the scrap section from the partially-finished actuator attaching area so that cutting surfaces left in the actuator attaching area are positioned onto the inner perimeter of the actuator attaching area and are oriented to at least partly face the actuator attaching position in the actuator attaching area.

4. A method of manufacturing a head suspension, using the base plate manufactured according to claim 3, comprising:

arranging an actuator at the actuator attaching position in the actuator attaching area of the base plate; and applying an adhesive to fix the actuator to the actuator attaching position and cover the cutting surfaces left in the actuator attaching area.

5. The method of claim 4, wherein a part of the cutting surfaces which is oriented to face the actuator attaching position is coated with the adhesive when the adhesive is applied between the actuator and the actuator attaching area to fix the actuator to the actuator attaching position.

6. The method of claim 5, wherein a part of the cutting surfaces that is not oriented to face the actuator attaching position is coated by additionally applying the adhesive.

* * * * *